March 5, 1968   R. L. BENINGER   3,371,769
ELEVATOR CONVEYOR

Filed Oct. 27, 1965   3 Sheets-Sheet 2

INVENTOR
ROBERT L. BENINGER

BY
ATTORNEYS

March 5, 1968  R. L. BENINGER  3,371,769
ELEVATOR CONVEYOR
Filed Oct. 27, 1965                     3 Sheets-Sheet 3

INVENTOR
ROBERT L. BENINGER
BY
ATTORNEYS

United States Patent Office 3,371,769
Patented Mar. 5, 1968

3,371,769
ELEVATOR CONVEYOR
Robert L. Beninger, Sheboygan, Wis., assignor to H. G. Weber and Company, Inc., Kiel, Wis., a corporation of Wisconsin
Filed Oct. 27, 1965, Ser. No. 505,323
15 Claims. (Cl. 198—154)

ABSTRACT OF THE DISCLOSURE

An elevator conveyor for receiving articles at one level and discharging the articles at another level. The elevator conveyor includes a series of article supports secured to the conveyor and movable therewith, and a backstop positioned relative to the article supports to form together with the article support means for balancing the article on the support en route from one level to another level.

---

This invention relates to article transfer means and particularly to an endless conveyor for transferring successive articles in a general vertical direction.

An object of the present invention is to provide a conveyor for transferring articles between different levels which is of great simplicity and economy and yet which is capable of reliable operation at relatively high speeds.

Another object of the invention is to provide a conveyor for elevating or lowering articles which is readily and simply adaptable to articles of different size.

Still another object of the present invention is to provide a vertical conveyor which is capable of relatively high speed automatic operation and yet which is constructed of a minimum number of low cost parts.

A feature of the invention resides in the provision of a conveyor for the vertical transfer of articles with the articles held in a stabilized off balance condition between an underlying article support on the conveyor and a stationary backstop means extending along the conveyor path. Preferably a vertically extending surface of the backstop means is spaced from the path of the article supports a distance to provide for off-balance positioning of the articles with a face portion of the articles gravity biased against and in sliding contact with the vertical surface during transfer. The conveyor is adjustable to different size articles and to articles with different locations of their center of gravity by shifting the backstop means relative to the path of the article supports. Preferably the backstop means is a unitary structure extending over the entire vertical transfer distance for continuous engagement with the articles being transported by the conveyor.

Other objects, features and advantages of the present invention will be apparent from the following detailed description taken in connection with the accompanying drawings, in which.

Figure 1:
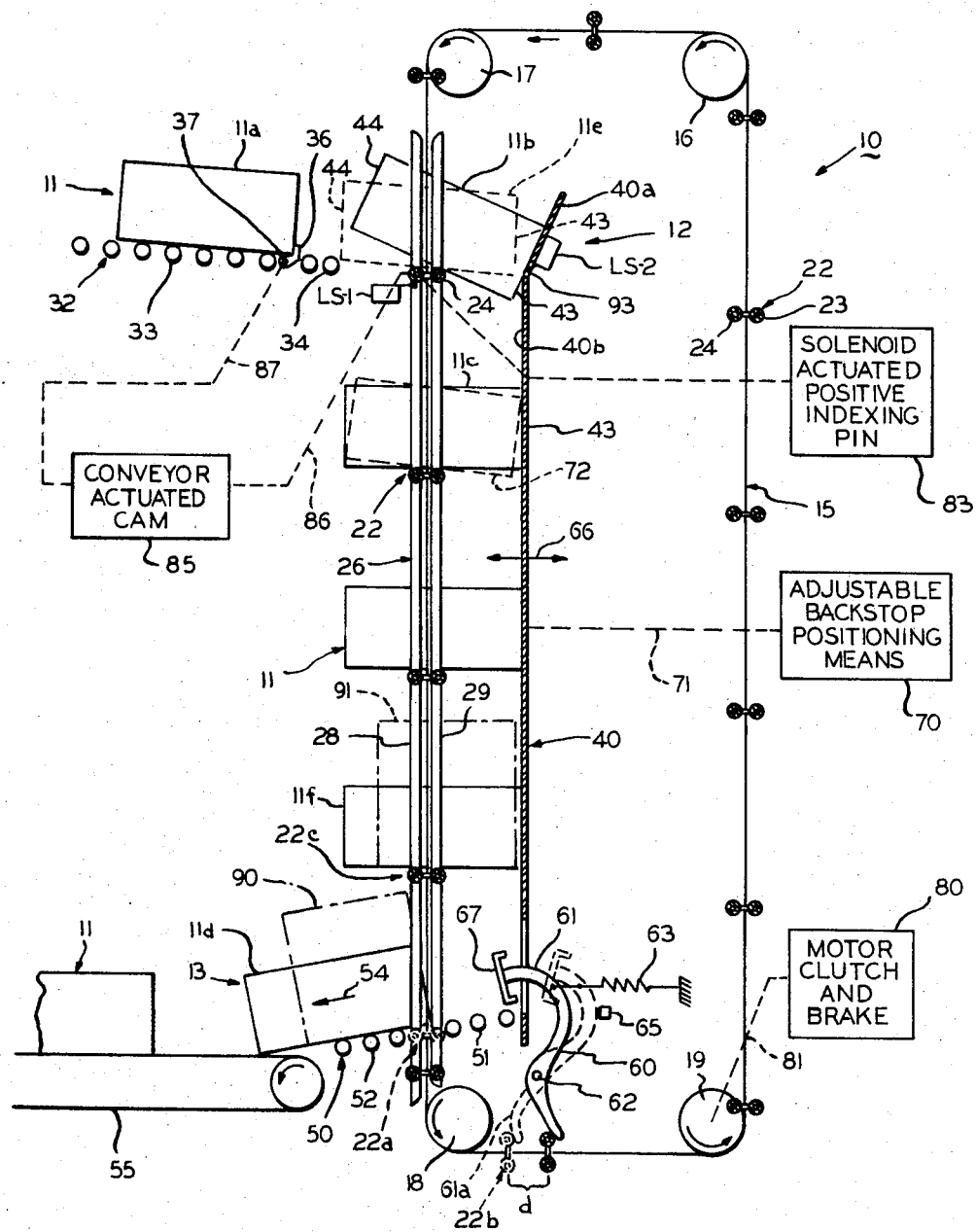
FIG. 1 is a diagrammatic illustration of a conveyor in accordance with the present invention for lowering articles.

Referring to FIG. 1, there is illustrated a conveyor 10 for transferring a succession of articles such as indicated at 11 from a loading level 12 to a discharge level 13.

In the illustrated embodiment, the conveyor 10 includes an endless chain 15 extending over upper sprocket wheels 16 and 17 and lower sprocket wheels 18 and 19. Secured to the chain at intervals are article support means 22. In the illustrated embodiment, such support means comprises rollers 23 and 24 secured to the chain 15 so as to have their upper surface portions lying in a common plane in the operative vertical run or path 26 of the conveyor. Lateral or twisting movement of the chain 15 such as might be induced by the load on the supports 22 is prevented by means of chain guides 28 and 29 extending along the vertical run 26 of the conveyor.

Articles are illustrated as being supplied to the conveyor at the loading level 12 by means of a gravity infeed conveyor 32 inclined, for example, at 5° to the horizontal. The conveyor may comprise a series of fixed rollers 33 and aligned removable rollers such as 34. The type of loading means depends, of course, upon the nature of the article, the illustrated conveyor 32 being suitable for supplying a succession of rectilinear cartons to the conveyor, for example. A mechanical cam-actuated case stop is indicated at 36 for stopping an article such as indicated at 11a in the position shown. When the stop 36 is pivoted about an axis such as indicated at 37 or otherwise suitably retracted from the path of articles on the conveyor 32, an article in the position indicated at 11a moves by gravity to a position such as indicated at 11b. In this position a face portion of the article 11b rests flatwise against an angled part 40a of a backstop 40. The article 11b assumes the tilted orientation indicated at 11b by virtue of the fact that the center of gravity of the articles is offset from the margin of the article support 22 so that the article is overbalanced and pivots about the margin which in the illustrated embodiment is provided by the upper periphery of roller 24. By way of example the bottom surface of the article 11b may extend at an angle of 25° to the horizontal and the upper part 40a of the backstop may extend at an angle of 65° to the horizontal. The conveyor may be stopped in the position shown in FIGURE 1 as an article moves to the position shown at 11b.

As the conveyor is indexed downwardly, the article such as indicated at 11b will pivot into a horizontal orientation with its end face in sliding contact with the vertical surface 40b of the backstop 40. In a position such as indicated for article 11c, the center of gravity of the article remains offset from the margin of the article support 22 so that the end face of the articles such as indicated at 43 is gravity biased against the vertical surface 40b of the backstop 40.

Preferably, a roller such as indicated at 34 is positioned so as to be in close confronting relation to the end face of the articles such as indicated at 44 as the articles pivot from the orientation shown for the article 11b to the horizontal orientation. The roller 34 thus prevents the rotational momentum of the article from pivoting the article off the article support in the counterclockwise direction as the article is moved downwardly from the position shown for article 11b. The rotational momentum is relatively great at relatively high operating speeds of the conveyor and with relatively heavy articles.

The stop 36 may be spring biased in the counterclockwise direction so as to automatically resume the position shown as soon as a case has travelled past the stop. By way of example if the stop 36 is pivotal on an axis 37, means is provided for preventing rotation of the stop in the counterclockwise direction beyond the position shown in FIGURE 1. The location and operation of the stop 36 will depend on the type of article being conveyed. Where the article has a smooth strip along its bottom surface from end to end, the stop 36 may be actuated to a release position only momentarily and then released so that the return spring means biases the upper edge of the stop against such smooth surface portion of the article such as 11a as the article travels past the stop. As soon as the trailing edge of the article passes the stop, the spring returns the stop to the position shown in FIGURE 1 for engaging and retaining the next succeeding article.

At the discharge level 13 is disposed a gravity discharge conveyor 50 comprising two series of rollers 51 and 52 disposed at an angle of 10°, for example, relative to the horizontal. The sections 51 and 52 have a space therebetween allowing passage of the article supports 22. An article such as 11d upon being deposited upon the conveyor 50 automatically moves by the action of gravity in the direction of arrow 54 and onto a power conveyor 55, for example. Preferably, the speed of operation of the conveyor 10 is such that the conveyor 10 need not stop during the discharge of articles therefrom. In one embodiment in accordance with the present invention, it was found that continuous operation was possible simply with the use of a gravity discharge conveyor. On the other hand, a pusher device such as indicated at 60 may be employed in conjunction with the conveyor 50 as indicated in FIGURE 1. The pusher 60 may comprise an arm 61 pivoted at 62 and urged by means of a tension spring 63 in the clockwise direction. Clockwise rotation is limited by means of a stop 65 to normally retain the arm in the position indicated in dotted outline at 61a. As indicated in FIGURE 1, the positioning may be such that as the carton support carrying a given article reaches a position such as indicated at 22a, a second carton support will be reaching a position such as indicated at 22b during an indexing movement of the conveyor. In this event, by the time the conveyor reaches a stop position such as indicated in FIGURE 1 in solid outline, the pusher 60 will have been projected to the position shown in solid outline so as to tend to accelerate movement of the article being discharged from the conveyor. The arrangement is such that the spring 63 will return the pusher to its initial position prior to the time when the next article reaches the vicinity of the pusher. In this way, the pusher can be synchronized in its operation with the movement of the conveyor and will operate effectively over a substantial range of conveyor speeds. For simplicity the pusher mechanism 60 may be mounted independently of the backstop 40 and may be arranged so that the pusher face 67 is clear of the path of the articles in the initial position of the pusher over the entire range of adjustment of the backstop 40 which is adjustable toward and away from the conveyor run 26 as indicated by the double headed arrow 66.

The means for adjustably positioning the backstop 40 to accommodate different size particles and articles with different locations of center of gravity is diagrammatically indicated by the component 70 which is mechanically coupled to the backstop 40 as indicated by the dash line 71.

For simplicity of disclosure, it may be assumed that the illustrated conveyor is actuated by means of a hand crank coupled to the sprocket wheel 19 in conjunction with a suitable hand controlled braking means. Where the weight of the articles on the conveyor is sufficient to overcome the inherent friction resisting movement of the conveyor, the hand crank will be used only for the original loading of the conveyor, after which gravity will be the only motive power with the brake means stopping the article support 22 at the proper position for loading.

In a presently preferred embodiment, the rollers 23 and 24 are attached at each end to parallel vertical chains, with proper attachments to keep the load bearing surfaces of the rollers approximately in a horizontal plane while accommodating joint tilting of the two rollers, for example, 3° in either direction from the horizontal, to insure that the two rollers will jointly support an article. By way of example, each of the rollers referred to herein such as rollers 23, 24, 33, 34, 51 and 52 may be freely rotatable on its longitudinal axis. By way of example, rollers 23 and 24 may have a diameter of 1⅜ inches and may be located with a center to center spacing of 1½ inches. A pair of chain guides such as 28 and 29 is preferably associated with each of the chains such as 15 in the vertical run 26.

For the illustrated article 11, the distance from the center of gravity to the article to end face 43 thereof may be less than the distance from the center of a roller 24 to the backstop 40 by approximately 1½ to 2 inches. When the article reaches an overbalance position such as indicated in dash outline at 11e in FIG. 1, the carton tilts into the position indicated at 11b. In general, the articles in a position such as indicated at 11c may have their center of gravity offset from the center of roller 24 toward the backstop 40 a distance of approximately 1 inch to 2 inches and may rest on both roller 23 and roller 24, but with the rollers accommodating a slight tilting of the article such as indicated at 72 in FIG. 1 but exaggerated for purposes of illustration.

With the illustrated embodiment, no adjustment of the conveyor is necessary for different heights or widths of articles, the maximum height of article to be handled being limited by the spacing between successive article supports 22, and the maximum width of article to be handled being determined by the spacing between the pair of parallel chains such as 15 at the vertical run 26. Preferably the spacing between article supports 22 and the spacing between the conveyor chains such as 15 is selected to accommodate the highest and widest articles which it is anticipated that the conveyor will be called upon to handle. To adjust the conveyor for a change in the length of articles being handled, the backstop 40 is adjusted by means of the positioning means 70. The backstop 40 is moved toward the vertical run 26 to adapt the conveyor for shorter articles and is moved away from the vertical run to adapt the conveyor for longer articles. Additionally, for shorter cases, further in-feed rollers such as 34 would be added, while rollers would be removed from the discharge roller section 51 to accommodate the new position of the backstop 40. In the case of a longer article, in-feed rollers such as 34 would be removed and discharge rollers would be added to the section 51.

While the foregoing is considered an adequate description of the present invention, enabling those skilled in the art to practice the invention either under manual or automatic control, it is desired to refer briefly to the additional components which might be typically employed in operating the illustrated conveyor automatically.

A first limit switch LS-1 is adjustably mounted adjacent the loading level 12 and is positioned for actuation by a moving part of the conveyor as the conveyor approaches the position indicated in solid outline in FIGURE 1. In effect, the limit switch LS-1 is positioned so as to be actuated shortly before the conveyor moves to its successive stop or loading positions. By way of example, actuation of limit switch LS-1 may cause the energizing circuit to component 80 to be interrupted. Where component 80 includes a motor and a clutch for driving the sprocket wheel 19, deenergization of component 80 will actuate the clutch to decouple the motor from the sprocket wheel 19. Simultaneously, a braking means associated with the component 80 may be applied to the shaft of sprocket 19 via a mechanical coupling such as represented at 81 to apply a stopping force to the conveyor.

Where gravity is relied upon as the sole motive power once the conveyor is loaded, component 80 need include only the requisite braking means.

The limit switch LS-1 may also control a solenoid actuated positive indexing pin component 83 which provides for precise positioning of the conveyor at its successive stop positions. For example, momentary actuation of limit switch LS-1 may serve to energize a latching relay having normally closed contacts controlling energization of component 80 and having normally open contacts controlling energization of a solenoid associated with component 83. A second limit switch LS-2 may control unlatching of the relay to resume driving of the conveyor. The limit switch LS-2 may be responsive to an article reaching the position indicated at 11b in FIGURE 1.

Component 85 in FIGURE 1 represents a conveyor actuated cam which is disposed for mechanical actuation by movement of the conveyor as indicated by the dash line 86 as the conveyor approaches each successive stop position. This cam component 85 is coupled to the pivotal stop member 36 as indicated by the dash line 87 so as to momentarily shift the stop member 36 to a release position as the conveyor approaches a stop position. The timing may be such that the stop 36 is again released after the conveyor reaches the stop position, suitable spring means serving to return the stop 36 to the position shown in FIGURE 1 as soon as the trailing edge of an article such as indicated at 11a travels past the stop member 36.

Upon closing of limit switch LS-2 by an article supplied from the in-feed conveyor 32, the clutch of component 80 is engaged and the brake released to initiate a further indexing movement of the conveyor. When the lowest article on the conveyor contacts the gravity discharge conveyor 50 it is automatically discharged onto the power take-away conveyor 55 without stopping of the conveyor 10. The conveyor motion may be so timed that it is not necessary to stop the conveyor at the time that articles are being discharged to the conveyor 55. In the illustrated arrangement, however, an article is stopped at a position such as indicated at 11f before it reaches a position where it would interfere with the discharge of the preceding article indicated at 11d. This relationship would not necessarily apply, however, with respect to an article having the maximum height for which the conveyor is designed. With such an article of maximum height, the article might reach a position such as indicated at 90 before the article support specifically identified as 22c reached the stop position shown, so that even though interference would be possible, the discharge of the article such as indicated at 90 would be sufficiently rapid so that the conveyor would not need to be stopped during the article discharge process.

It should be understood that the present disclosure specifically includes the case where component 80 consists of a braking means for the conveyor 10 only, a hand powered assist such as a crank being employed for original loading of the conveyor until there is enough weight in the conveyor system to make it self-operating under impetus of gravity. In this case, the braking means may be automatically energized each time limit switch LS-1 is actuated to stop the conveyor in the successive loading positions, the brake being released in response to actuation of limit switch LS-2. Preferably, the force of gravity would be sufficient to actuate the pusher 60 in each successive cycle of operation where acceleration of discharge of the successive articles is desired. The indexing pin component 83 may be utilized in conjunction with the gravity operated system, if desired.

Preferably, for each size of case to be conveyed, the in-feed roller such as indicated at 34 nearest to the conveyor vertical run 26 is arranged so as to insure against counterclockwise rotation of the article off of its article support as the article moves downwardly from a position such as indicated at 11b in FIGURE 1.

*Summary of operation of the embodiment shown in FIGURE 1*

For the illustrated embodiment, backstop 40 is positioned by the adjustable positioning means 70 so that the articles to be transferred are carried on the article supports 22 with the center of gravity of the articles offset toward the backstop 40 from the center of the support roller 24. By his arrangement, the successive articles are gravity biased against the backstop 40 as they are transferred from the loading level 12 downwardly to the discharge level 13.

The backstop 40 is provided with an inclined upper end portion 40a, so that the successive articles assume an inclined position as indicated at 11b to prevent rebounding of an incoming article when it moves into engagement with the backstop 40.

In the illustrated embodiment, a limit switch LS-1 may be provided for actuation by each of the successive article supports 22 to stop the conveyor at successive loading positions such as that shown in FIG. 1.

A gravity discharge conveyor 50 may be provided which is arranged to discharge the articles without requiring stopping of the conveyor for this purpose. A conveyor actuated pusher 60 may be provided to accelerate the discharge of the articles from the conveyor so that even an article of maximum height such as indicated at 90 will clear the next preceding article such as indicated at 91 even where the successive stop positions are such that the article 91 would interfere with the article 90 in the absence of rapid discharge of the article 90.

Figure 2:
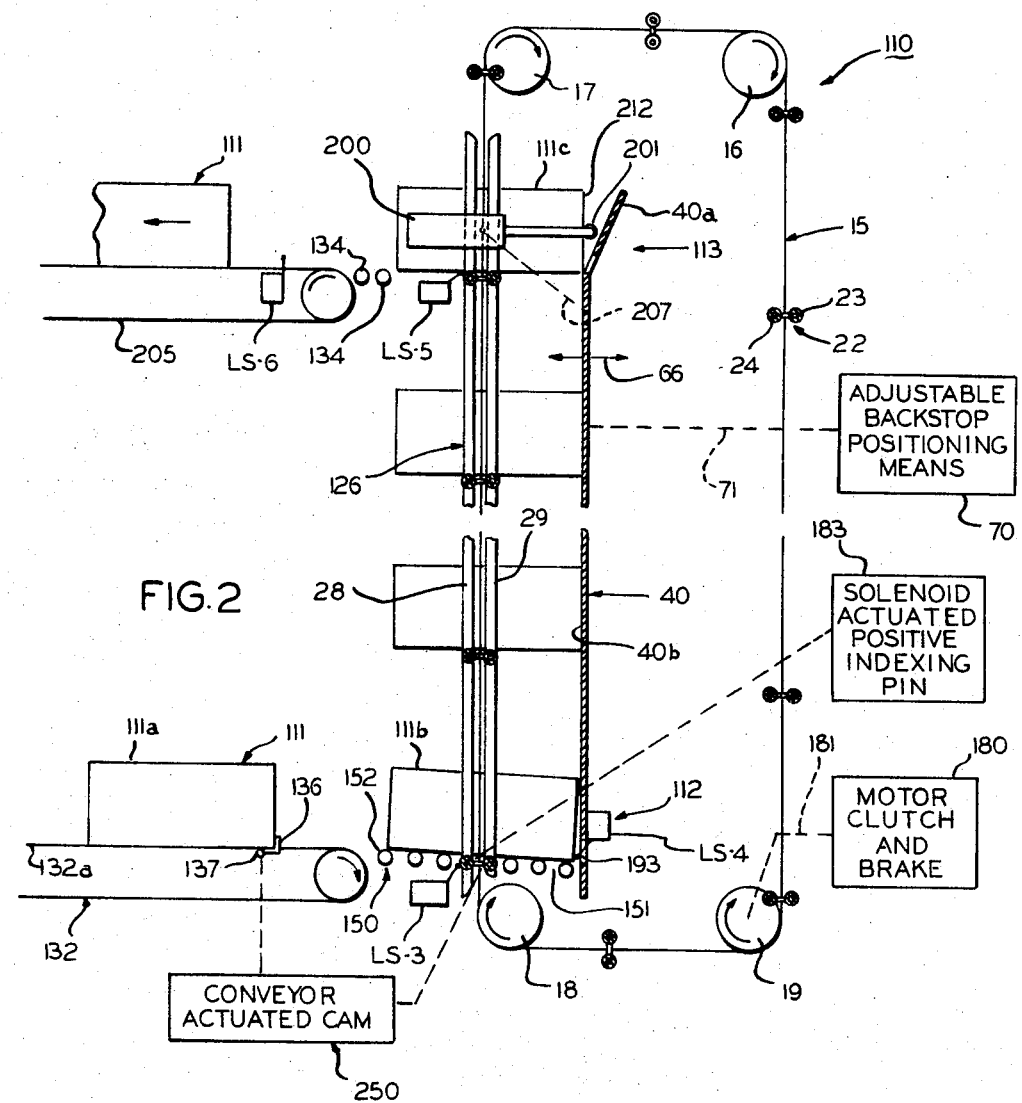
FIG. 2 is a similar diagrammatic view showing a conveyor in accordance with the present invention operated so as to elevate a series of articles.

FIG. 2 illustrates the structure of FIG. 1 operated as a conveyor system 10 for elevating articles generally designated by reference numeral 111 from a loading level 112 to a discharge level 113. The components of the conveyor itself may be identical to those shown in FIG. 1, and these components have been given the same reference numerals in FIGS. 1 and 2.

The articles 111 are supplied to the conveyor system 110 at the loading level 112 by means of a powered or gravity in-feed conveyor 132. A stop member 136 is illustrated for stopping an incoming article at a position such as indicated for the article specifically designated by reference numeral 111a in FIG. 2. The stop 136 may be pivotal on an axis 137 to a retracted position out of the path of the articles so as to allow an article to move onto a gravity in-feed conveyor 150. The characteristics of the stop 136 may correspond to those of the stop 136 of FIG. 1, the stop 136, however, being located so as to avoid interference with the run 132a of conveyor 132. Simply by way of example, the conveyor 132 may comprise two separate belts with the stop 136 located centrally between the two belts.

The gravity in-feed conveyor 150 may comprise two sections having rollers 151 and 152, respectively, and structurally identical to the sections having rollers 51 and 52 of FIG. 1. By way of example only, the sections 151 and 152 may provide a gravity in-feed conveyor having a 2° pitch. As in the embodiment of FIG. 1, the rollers of sections 151 and 152 may be freely rotatable on their longitudinal axes, and the rollers may be removable from section 151 to accommodate adjustment of the backstop 40 closer to the vertical run 126 of the conveyor 110.

An article in the position shown at 111b has its center of gravity offset from the center of support roller 24 toward the backstop 40 as in the embodiment of FIG. 1. For example, the center of gravity of the articles 111 may be offset from the center of roller 24 (in the horizontal direction toward backstop 40) by a distance of approximately 1 inch to 2 inches. With this arrangement as the conveyor chains such as 15 are driven in the clockwise direction about the conveyor path, an article support 22 will move into supporting relation to an article such as 111b and elevate the same to the discharge level 113 with an end face of the article in sliding gravity biased relationship to the vertical surface 40b of the backstop 40.

The conveyor may be moved intermittently for example by means of a component 180 including a motor and clutch for driving the sprocket 19 and a braking means for stopping the conveyor, these parts being coupled to the shaft of the sprocket 19 mechanically as indicated by the dash line 181. The successive stop positions of the conveyor 110 may correspond to that specifically shown in FIGURE 2. For purposes of a simplified disclosure, it may be assumed that the component 180 is manually controlled. Components 80 and 180 may, of course, be identical if a reversible motor component is included, or if no motor is utilized in the operation of the system 10 of FIG. 1, and the components 80 and 180 may be considered as both manually operable and automatically operable and automatically operable at the election of the operator.

At the discharge level 113, a discharge cylinder 200 may be provided having its piston connected to a discharge roller or arm 201 which is adapted to engage the rear face of an article such as article 111c to move the article over removable rollers such as 134 and onto a powered or gravity take-away conveyor 205. The structure is such that further rollers 134 may be added to adjust the system to smaller articles, and the rollers 134 are removable to adjust the system to articles having a greater dimension in the direction at right angles to the plane of the backstop surface 40b. The rollers 134 and 201 may be freely rotatable on their longitudinal axes, and discharge cylinder 200 may operate while the conveyor 110 is in motion.

The dimensions given by way of example and not of limitation with reference to parts shown in FIGURE 1, are of course, also applicable to the corresponding numbered parts in FIGURE 2.

Where the rollers 134 and the roller sections 151 and 152 are to be the same rollers as those numbered 34, 51 and 52 in FIGURE 1, it will be understood that suitable means for mounting these rollers is provided which provides for an adjustment in the incline or pitch of the rollers. Thus the rollers 34 of FIGURE 1 could be provided with a mounting means not only accommodating their selective removal, but also providing for a tilting of the rollers to provide a 5° pitch toward the conveyor 10 or to provide a level orientation or opposite pitch away from the conveyor when used in a system such as indicated at 110. Similarly the rollers 51 and 52 could have a mounting from which the rollers are detachable and which mounting accommodates a 10° pitch of the rollers away from the conveyor or a 2° pitch toward the conveyor depending upon whether the structure is operated as in FIGURE 1 or FIGURE 2.

In the illustrated embodiment, the discharge cylinder 200 is mounted in fixed relation to the backstop 40 as indicated by the dash line 207. As in FIGURE 1, the backstop 40 is adjustable in opposite directions as indicated by the double headed arrow 66, the backstop being indicated as being secured to an adjustable backstop positioning means 70 by means of a mechanical link indicated at 71.

The means 200 for discharging articles from the conveyor at the discharge level 113 has been specifically illustrated as an air operated cylinder, but any suitable mechanical, electrical or hydraulic means may be utilized in place of such an air cylinder. By way of example, the roller 201 may be removable to accommodate operation of the system 110 in the mode illustrated in FIGURE 1.

While the foregoing description of the system of FIGURE 2 is considered adequate to enable those skilled in the art to practice the invention either by hand operation or automatically, the following details are indicated by way of example to illustrate adaptation of the system 110 to automatic operation.

A limit switch LS-3 is indicated for actuation by the carton supports 22. This limit switch may disengage the motor of component 180 and apply the brake as each carton support 22 approaches a position in alignment with conveyor sections 155 and 152. The limit switch LS-3 may also control energization of a solenoid associated with solenoid actuated positive indexing pin component 183. The electric circuitry may correspond to that referred to in connection with limit switch LS-1 of FIGURE 1. The indexing pin would be operative to precisely position an article support at the desired position relative to conveyor 150 each time the conveyor system 110 is stopped.

Limit switch LS-4 is provided with an actuating arm as indicated at 193 for operation as an article moves to the position indicated at 111b in FIGURE 2. The limit switch LS-4 could conveniently control reenergization of component 180 and deenergization of the solenoid associated with component 183 as described for limit switch LS-2 in FIGURE 1. The pitch of the conveyor 150 may be selected so as to insure that limit switch LS-4 is reliably actuated by each succeeding article supplied to the conveyor system 110.

A limit switch may be provided as indicated at LS-5 for initiating operation of the article discharge means 200 as an article support 22 approaches the discharge level 113. The limit switch LS-5 may be actuated by a convenient portion of the successive article supports 22 as they approach the discharge level 113. In the illustrated embodiment, a further limit switch is indicated at LS-6 for responding to the discharge of each article and controlling the return of the roller 201 to its rest position indicated in FIG. 2. Since the cylinder 200 is secured to the backstop, the position of the limit switch LS-6 usually must be adjusted whenever the backstop 40 is adjusted for a longer or shorter size article.

The system 110 may be operated continuously where there is an article in the position of article 111b when the machine is placed in operation, and where a continuous supply of articles is available from the in-feed conveyor 132, the stop 136 being placed in the inoperative position for continuous operation. With the continuous operation, the article being elevated such as that indicated at 111b in FIGURE 2 serves as a stop for the next succeeding article being supplied by the conveyor 132 until the article such as 111b is elevated above the incoming article, whereupon the incoming article moves into a position against the backstop 40. The next succeeding article support 22 will engage this incoming article to repeat the process. Discharge may be automatic as with with intermittent operation, so that the system 110 is capable of continuous operation without stopping so long as there is a continuous supply of incoming articles.

*Summary of operation of the embodiment shown in FIG. 2*

In the illustrated embodiment, article stop member 136 is released to allow the conveyor 132 to supply an article to the position shown at 111b, FIG. 2. The conveyor system 110 is then activated and an article reaching a position indicated at 111c at the discharge level 113 is removed from the conveyor by means of the discharge means 200. Discharge may take place while the conveyor system 110 is in motion.

As in the embodiment of FIG. 1, the center of gravity of the articles being elevated is offset toward the backstop 40 from the vertical plane extending through the centers of the rollers 24 in the vertical run 126. Thus, the articles in the vertical run 126 are gravity biased against the backstop 40 and travel vertically with end faces thereof in sliding contact with the vertical face 40b of the backstop 40.

The roller 201 is disposed at a position to engage the end face such as 212 of an article before the lower part of the end face leaves engagement with the backstop vertical face 40b. Thus, even if the vertical face 40b does not extend up to the level of roller 201, the roller 201 will prevent clockwise pivoting of an article as it approaches the discharge evel. As an alternative the backstop 40 could be provided with a vertical extension when used in an elevator system, the vertical extension terminating just below the level of roller 201.

*Illustrative details of construction*

Figure 4:
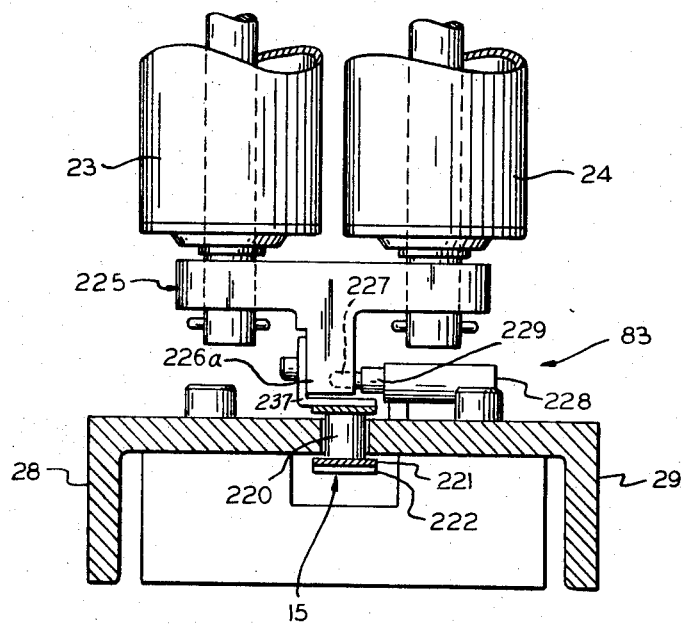
FIG. 4 is a partial horizontal sectional view taken generally along the line IV—IV of FIG. 3.
Figure 3:
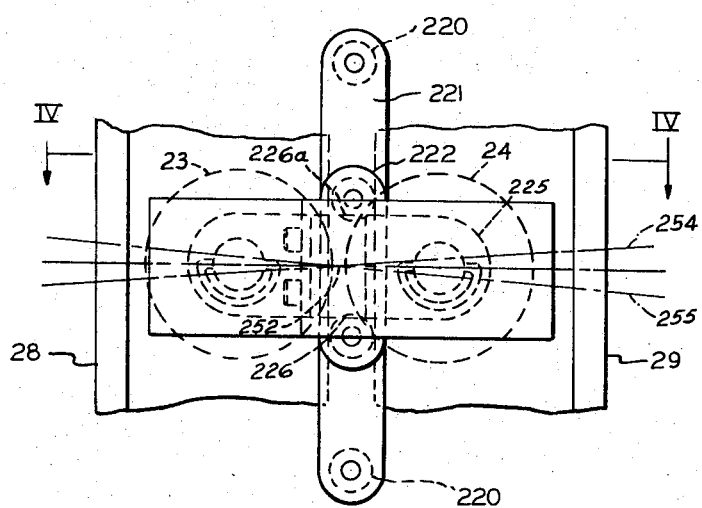
FIG. 3 is a partial elevational view illustrating exemplary details for the conveyors of FIGS. 1 and 2.

Referring to FIGS. 3 and 4, each of the chain loops may be formed of a series of rollers 220 connected by overlapping links such as 221 and 222 at each side of the rollers 220. The rollers 220 have a diameter substantially corresponding to the spacing between the guides such as 28 and 29 in the vertical run 26 of the conveyor. The sprocket 17 and the other sprockets are provided with teeth which fit between the successive rollers 220 so as to receive and guide the chain.

By way of example, a mounting plate 225 may be secured to each of the chains at spaced intervals for carrying the article supporting rollers 23 and 24. The plates 225 may each have a lower face 226 and an upper face 226a, the locating pin 227 associated with component 83 of FIG. 1 cooperating with the lower face 226. The upper face 226a would be engaged by component 183 of FIG. 2. FIG. 4 shows a solenoid 228 energized to project an armature 229 to position the pin 227 in the path of the face 226 of mounting plate 225. When the solenoid 228 is deenergized, suitable spring means retracts the armature 229 and thus the pin 227 to allow further movement of the conveyor system 10. The operation is similar for conveyor system 110.

Figure 5:
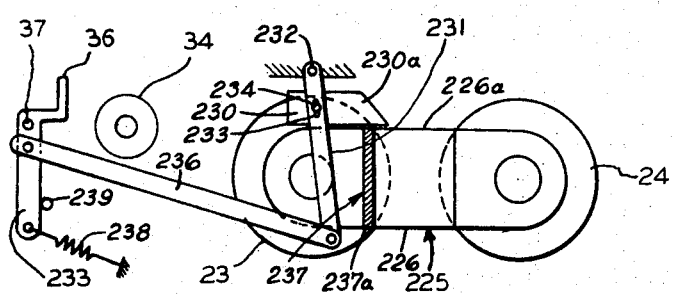
FIG. 5 is a diagrammatic vertical sectional view indicating further exemplary details of construction for the conveyors of FIGS. 1 and 2.

FIG. 5 shows exemplary details of the conveyor actuated cam component 85. This component may comprise a horizontally shiftable cam plate 230 and a lever arm 231 pivotally mounted at 232 and having a slot 233 receiving a pin 234 on the cam plate 230. The lower end of the lever arm 231 is coupled to the stop 36 by means of a link 236 so that clockwise movement of the lever arm 231 will shift the stop 36 in the clockwise direction to a retracted position. A spring 238 may normally hold stop member 36 in its operative position, counterclockwise pivoting of stop member 36 being limited by a fixed pin 239. A beveled end face 230a of cam plate 230 may be disposed in the path of movement of a portion 237a of a bracket 237 so that as an article support 22 moves downwardly to the position indicated in FIG. 5, the stop 36 will be momentarily moved to its release position and then allowed to return as soon as the trailing edge of the released article moves past the stop 36. An entirely similar arrangement may be provided for the conveyor actuated cam component indicated at 250 in FIG. 2 which may automatically control the article stop member 136. Of course, for purposes of this disclosure, the stop members 36 and 136 may be operated by any suitable means, and may be considered to be manually operable.

As indicated in FIG. 3, the rollers 23 and 24 may be jointly pivotal about an axis generally indicated at 252, between extreme positions indicated by lines 254 and 255. The extreme position indicated at 255 is downwardly inclined at a slight angle of the order of 3° to gravity bias the article supported on the rollers against the backstop 40.

It will be apparent that many modifications and variations may be effected without departing from the scope of the novel concepts of the present invention.

I claim as my invention:

1. A conveyor structure comprising:
   flexible endless conveying means having a generally vertical article carrying run and a spaced return run;
   said endless conveying means having a series of article supports secured thereto at spaced intervals along the length thereof and movable with said conveying means from a loading level to a discharge level of said article carrying run;
   a backstop spaced horizontally from said article carrying run and extending generally parallel thereto;
   the side of said article carrying run opposite said backstop being free for substantially the length thereof, to accommodate the delivery and discharge of articles onto and from said vertical article carrying run;
   each of said article supports including means supporting an article to be gravity biased against said backstop, as the article support moves from a loading level to a discharge level;
   said backstop having article engaging means at the loading level diverging from said article carrying run and cooperating with an article support at the loading level to be engaged by an incoming article delivered to an associated article support and to support the delivered article in an orientation which is downwardly inclined from the article support to the backstop with the center of gravity of the article spaced from the associated article support toward said backstop.

2. The conveyor structure of claim 1 with each of said article supports having fulcrum means about which an article on said support tends to pivot when the center of gravity of the article is horizontally offset from said fulcrum means in the loading direction toward said backstop, said article engaging means being disposed to engage an incoming article after the article has moved onto an article support at the loading level and has pivoted about said fulcrum means through a substantial angle to assume said downwardly inclined orientation.

3. The conveyor structure of claim 1 with said conveyor being movable along said vertical run in a downward direction, said backstop being arranged to shift an article out of said downwardly inclined orientation at said substantial angle to the horizontal as the article support moves downwardly from the loading level toward said discharge level, the article supporting means in conjunction with the backstop being constructed to maintain the article in a slightly downwardly inclined orientation at an angle to the horizontal substantially less than said substantial angle as the article is lowered toward said discharge level.

4. The conveyor structure of claim 3 with guide means along which the incoming articles move at said loading level in said loading direction, and said guide means being disposed to prevent reverse pivotal movement of an article off of said article support as the article support is lowered from the loading level and the article is shifted from said downwardly inclined orientation at said substantial angle toward said slightly downwardly inclined orientation.

5. The conveyor structure of claim 3 with said article engaging means of said backstop comprising an inclined backstop portion extending at an oblique angle to the horizontal of the order of 65°, said backstop having a substantially vertical backstop portion below said inclined portion, the inclined backstop portion thereby being constructed so that said substantial angle is of the order of 25°, the article supports being angularly shiftable to an orientation which is downwardly inclined by an angle of the order of 3° so that said slight angle is of the order of 3°.

6. In a vertically movable conveyor structure,
   endless conveying means having a generally vertical material carrying run and a horizontally spaced return run,
   vertical guide means for said material carrying run,
   a series of article supports spaced along and secured to said conveying means at intervals,
   means supplying articles to said article supports and having a delivery end portion spaced laterally from said guide means and article supports,
   a vertical backstop on the opposite side of said guide means and article supports from said delivery end portion of said supply means,
   said backstop being spaced from said vertical guide means a greater distance than the spacing of the delivery end portion of said supply means from said guide means, whereby each article delivered to said backstop is guided by said delivery end portion as it passes thereby to a position with its center of gravity closer to said backstop than to said delivery end portion, to maintain the article in slidable engagement with said backstop by the weight of the article overhanging the side of the article support adjacent the backstop.

7. The structure of claim 6,
wherein the backstop has article engaging means in general alignment with said delivery end portion of said means supplying articles to said article supports and diverging from said guide means to support the incoming article with its center of gravity spaced from said article support toward said backstop at a downwardly inclined angle from the article support to the backstop, and
wherein the article fulcrums about the line of connection of said engaging means with said backstop to a generally horizontal position and is guided by said delivery end portion as the article passes thereby to pass downwardly along said backstop with its center of gravity between said endless conveying means and said backstop.

8. The structure of claim 7,
wherein the article supports comprises at least one roller supporting the article off-center to be slightly inclined by gravity downwardly from said roller to said backstop.

9. The structure of claim 6,
wherein the article supports each comprise two spaced rollers mounted for rotation about parallel horizontal axes and having material supporting surfaces lying generally in a common horizontal plane, and
wherein mounting means are provided mounting said rollers on said endless conveying means to position the rollers to tilt in a slight downwardly inclined orientation, to gravity bias the article on said rollers into engagement with said backstop.

10. The structure of claim 6,
wherein an inclined gravity discharge conveyor is disposed at the discharge level of said conveying means and comprises a series of rollers forming an inclined plane and extending an opposite sides of said guide means, and
wherein ejector means operated by travel of said conveyor means successively eject the articles along said gravity discharge conveyor.

11. The structure of claim 10,
wherein ejector means comprises a lever adjacent said backstop and pivoted intermediate its ends and cammed by said article supports to successively move in a direction to eject an article along said gravity discharge conveyor as the articles are deposited thereon.

12. The structure of claim 7,
wherein the conveying means is intermittently operable,
wherein means are provided to start said conveying mean upon delivery of an article to said article engaging means, and
wherein said delivery end portion of said means supplying articles to said article supports guides and maintains the article on its associated article support with the center of gravity of the article between said conveying means and said backstop upon movement of said conveying means to pivot the article into a generally horizontal position for movement along said backstop.

13. A conveyor structure comprising
an endless conveyor having a generally vertical article carrying run arranged for receiving successive articles at a loading level and for vertically transporting the articles to a discharge level,
said conveyor having a series of article supports secured thereto at spaced intervals along the length thereof and movable with said conveyor from the loading level to the discharge level of said run, and
a backstop disposed generally vertically and horizontally spaced from said vertical run and spaced from and extending along one side only of said vertical article carrying run,
each of said article supports having means for supporting an article so as to be gravity biased against said backstop as the article support moves from the loading level to the discharge level of said vertical run,
said backstop having article engaging means at the loading level for cooperation with an article support at the loading level and diverging from the article carrying run, to receive an incoming article moving in a loading direction toward said backstop and to support the incoming article in an orientation which is downwardly inclined as viewed from the article support to the article engaging means at a substantial angle to the horizontal thereby to reliably position the incoming article on the conveyor.

14. A conveyor structure comprising
an endless conveyor having a generally vertical run thereof arranged for receiving successive articles at a loading level and for vertically transporting the articles to a discharge level,
said conveyor having a series of article supports secured thereto at spaced intervals along the length thereof and movable with said conveyor from the loading level to the discharge level of said run, and
a backstop disposed generally vertically and horizontally spaced from said vertical run and extending along said vertical run,
each of said article supports having means for supporting an article so as to be gravity biased against said backstop as the article support moves from the loading level to the discharge level of said vertical run,
said article supporting means each comprising at least two rollers having substantially parallel axes, the tops of the two rollers lying generally in a common horizontal plane, and the rollers being jointly positionable to tilt the rollers in a slightly downwardly inclined orientation, thereby to gravity bias the article on said rollers against said backstop.

15. A conveyor structure comprising:
flexible endless conveying means having a generally vertical article carrying run and a spaced return run;
said endless conveying means having a series of article supports secured thereto at spaced intervals along the length thereof and movable with said conveying means from a loading level to a discharge level of said article carrying run;
a backstop spaced horizontally from said article carrying run and extending generally parallel thereto,
wherein the improvement comprises each of said article supports including means for assuming a downwardly inclined orientation with respect to the direction toward said backstop during movement along said generally vertical article carrying run from the loading level to the discharge level, said means movably supporting an article in a corresponding downwardly inclined orientation so as accommodate movement of the supported article under the action of gravity against said backstop and to provide continuous gravity bias of the article against the backstop during transfer of the article from the loading level to the discharge level of said article carrying run.

References Cited

UNITED STATES PATENTS 1,193,118  8/1916  Buck _____ 198—28
2,615,554  10/1952  Huber _____ 198—160 X EDWARD A. SROKA, *Primary Examiner.*

EVON C. BLUNK, *Examiner.*

A. C. HODGSON, *Assistant Examiner.*